(12) United States Patent
Walser et al.

(10) Patent No.: US 7,937,282 B2
(45) Date of Patent: *May 3, 2011

(54) GENERATING AN OPTIMIZED PRICE SCHEDULE FOR A PRODUCT

(75) Inventors: Joachim P. Walser, Dallas, TX (US); Vibhu Kalyan, Plano, TX (US); Srinivas Palamarthy, Euless, TX (US); James M. Crawford, Jr., Flower Mound, TX (US); Mukesh Dalal, Flower Mound, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/115,016

(22) Filed: May 5, 2008

(65) Prior Publication Data

US 2008/0208678 A1 Aug. 28, 2008

Related U.S. Application Data

(62) Division of application No. 09/896,388, filed on Jun. 28, 2001.

(60) Provisional application No. 60/238,676, filed on Oct. 6, 2000.

(51) Int. Cl.
*G06F 9/44* (2006.01)

(52) U.S. Cl. .............................................. 705/7; 705/10
(58) Field of Classification Search ................. 705/7, 10
See application file for complete search history.

(56) References Cited

U.S. PATENT DOCUMENTS

| 5,377,095 | A | | 12/1994 | Maeda et al. |
| 5,793,632 | A | | 8/1998 | Fad et al. |
| 5,950,171 | A | | 9/1999 | Madell |
| 5,960,407 | A | | 9/1999 | Vivona |
| 5,970,476 | A | | 10/1999 | Fahey |
| 5,987,425 | A | | 11/1999 | Hartman et al. |
| 6,021,402 | A | * | 2/2000 | Takriti ........................... 705/412 |
| 6,151,582 | A | * | 11/2000 | Huang et al. ...................... 705/8 |
| 6,226,625 | B1 | | 5/2001 | Levenstein |

OTHER PUBLICATIONS

G. Anandalingam, Hierarchical Optimization: An Introduction, Annals of Operations Research 34(1992)1-11.*
Guillermo Gallego and Garrett van Ryzin, "Optimal Dynamic Pricing of Inventories with Stochastic Demand over Finite Horizons", Management Science, vol. 40, No. 8 (Aug. 1994), pp. 999-1020.*

(Continued)

*Primary Examiner* — Romain Jeanty
*Assistant Examiner* — Mark A Fleischer
(74) *Attorney, Agent, or Firm* — Booth Udall, PLC; Steven J. Laureanti

(57) ABSTRACT

Generating a price schedule involves generating a graph having paths that include states with values. The graph is generated by determining the values of a successor state from the values of a predecessor state. An optimal path is selected, and a price schedule is determined from the optimal path. Computing an elasticity curve involves having a demand model, values for demand model, and filter sets that restrict the values. Elasticity curves are determined by filtering the values using filter sets, and calculating the elasticity curve using the demand model. A best-fitting elasticity curve is selected. Adjusting a demand forecast value includes estimating an inventory and a demand at a number of locations. An expected number of unrealized sales at each location is calculated. An sales forecast value is determined according to the expected number.

14 Claims, 6 Drawing Sheets

OTHER PUBLICATIONS

Using quantitative models for setting retail prices bySaroja Subrahmanyan. The Journal of Product and Brand Management. Santa Barbara: 2000. vol. 9, Iss. 5; p. 304.*

A periodic review inventory model with demand influenced by promotion decisions by Feng Cheng; Suresh P Sethi Management Science; Nov. 1999; 45, 11; p. 1510.*

Richard E. Chatwin; Optimal dynamic pricing of perishable products with stochastic demand and a finite set of prices, European Journal of Operational Research 125 (2000) 149-174.*

Optimal Pricing Strategy for New Products Author(s): Trichy V. Krishnan, Frank M. Bass, Dipak C. Jaino Source: Management Science, vol. 45, No. 12 (Dec. 1999), pp. 1650-1663.*

Richard E. Chatwin; Optimal dynamic pricing of perishable products with stochastic demand and a finite set of prices, European Journal of Operational Research 125 (2000) 149-174.*

Optimal Pricing Strategy for New Products Author(s): Trichy V. Krishnan, Frank M. Bass, Dipak C. Jain Source: Management Science, vol. 45, No. 12 (Dec. 1999), pp. 1650-1663.*

Narendra Agrawal, "Sourcing Strategy and Material Control: An Integrated Model", dissertation, University of Pennsylvania, 1994.*

* cited by examiner

US 7,937,282 B2

GENERATING AN OPTIMIZED PRICE SCHEDULE FOR A PRODUCT

CLAIM OF PRIORITY

This application is a divisional of U.S. patent application Ser. No. 09/896,388 filed on 28 Jun. 2001 entitled "GENERATING AN OPTIMIZED PRICE SCHEDULE FOR A PRODUCT", and which claims the benefit under 35 U.S.C. §119(e) of U.S. Provisional Application Ser. No. 60/238,676, filed Oct. 6, 2000. U.S. patent application Ser. No. 09/896,388 and U.S. Provisional Application Ser. No. 60/238,676 are commonly assigned to the assignee of the present application. The disclosure of related U.S. patent application Ser. No. 09/896,388 and U.S. Provisional Application Ser. No. 60/238,676 are hereby incorporated by reference into the present disclosure as if fully set forth herein.

BACKGROUND

1. Technical Field of the Invention

This invention relates in general to commercial environments, and more particularly to generating an optimized price schedule for a product.

2. Background of the Invention

An important decision for a business to make is determining the prices of products, goods, or services offered by the business. Pricing decisions are important to a business's success or failure, since these decisions may have a critical impact on customer demand, profitability, and business operations. Informed pricing decisions, however, may be difficult to make, since these decisions may need to reflect a large number of business objectives and operating constraints, and may need to be made for a large number of items across a large number of sales locations. Moreover, pricing decisions may need to be frequently updated in order to adjust for rapid changes in business conditions, such as changes in inventory, demand, or a competitor's prices. Consequently, businesses may benefit greatly from price optimization, which may allow businesses to make effective pricing decisions.

A business may generate a price schedule over a time horizon, and may optimize the price schedule in order to maximize the benefit of a product to the business. For example, a price schedule may be optimized to maximize expected profits or revenues over a time horizon, subject to operating constraints such as an allowed frequency of price changes, a maximum number of price changes, or an inventory target level. Optimizing price schedules, however, may be computationally difficult. As a result, previous techniques for generating an optimized price schedule have been inadequate.

SUMMARY OF THE INVENTION

In accordance with the present invention, disadvantages and problems associated with generating price schedules have been substantially reduced or eliminated.

In accordance with an embodiment of the present invention, a method for generating a price schedule includes generating a transition graph having paths. Each path has states, and each state has a price value, an inventory value, and a state value. The transition graph is generated by repeating the following for a number of stages until a last stage is reached. The price value of a successor state is determined. The inventory value of the successor state is calculated using the price value and the inventory value of a predecessor state. The state value of the successor state is calculated using the price value and the inventory value of the predecessor state. After the last stage has been reached, an optimal path is selected according to the state values of the states, and a price schedule is determined from the optimal path.

In accordance with another embodiment of the present invention, a method for computing an elasticity curve includes selecting a demand model having a number of variables. A number of values for each variable are received. Filter sets that restrict the values for at least one variable are defined. An elasticity curve is determined for each filter set by filtering the values for at least one variable using the filter set, and calculating the elasticity curve from the filtered values by performing a regression analysis using the demand model as a regression equation. A quality value is measured for each elasticity curve, and an optimal elasticity curve is selected according to the quality values.

In accordance with another embodiment of the present invention, a method for determining a sales forecast from an estimated demand and inventory includes defining a number of locations. An inventory and a demand are estimated at each location. An expected number of unrealized sales at each location is calculated using a difference between the demand and the inventory at the location. A sales forecast is determined using the expected number of unrealized sales.

Certain embodiments of the present invention may provide one or more technical advantages over previous price scheduling techniques. Selling goods typically requires dynamic adjustment of a sales price over a time horizon. Given a forecast of product demand over time and a model of price elasticity, the present invention may calculate a price schedule that maximizes a business objective such as cumulative revenue, while satisfying business constraints such as a desired price behavior or an inventory target level.

The present invention may generate price schedules that satisfy a variety of operating constraints. Price schedules are typically required to meet operating constraints such as a maximum number of price changes within a given time period of a time horizon, a maximum number of price changes over a time horizon, or a maximum price change over a time horizon. Price values may be constrained to meet specific price rules, for example, a price value must have a "9" in the cents position. Price values may be constrained to adhere to certain price reduction levels, such as 25%, 50%, or 75% off a base price. Constraints may be applied to the inventory age as described by the time the products are stored in inventory. The present invention may generate price schedules that satisfy these and other operating constraints.

The present invention may allow for optimization of a variety of business objectives. Objectives may include, but are not limited to, margin and revenue considerations, opportunity costs of capital, inventory carrying costs, inventory age, costs of implementing price changes, impact on profits of substitute products, or opportunity costs of allocated shelf-space, or any other suitable objective.

The present invention may be extended to incorporate an uncertainty of a demand forecast or an elasticity model in order to achieve certain statistical guarantees of performance of computed price schedules. The invention may be extended to compute price schedules of portfolios of products while considering price constraints between these products, or price schedules for groups of locations given price constraints between locations in the group.

The present invention may efficiently generate an optimized price schedule using a "quantized dynamic programming" technique. A transition graph with paths representing possible price schedules may be generated using quantized dynamic programming. An optimal path of the transition graph is selected in order to determine an optimized price schedule. The present invention may improve the efficiency of the optimization by quantizing values associated with the transition graph at various degrees of granularity. Quantizing the state values reduces the size of transition graph, which may improve the processing time and power required to determine an optimal path of the transition graph.

The present invention may take into account the elasticity of a product in order to improve the accuracy of the optimization. The elasticity of a product describes a change in the demand of a product in response to a change in the price of the product. The present invention may take into account the effect of unrealized sales due to supply limitations, which may improve the accuracy of the optimal path. An unrealized sale is predicted where there is a demand for a product, but no inventory, and may result when inventory is distributed across a group of locations that are being optimized together. Typically, aggregate values only take into account a total demand and a total inventory and do not account for supply limitations.

The present invention may be used to compute an optimal sequence of product markdowns for liquidating merchandise, which may enable sellers to better plan and more profitably manage inventory, such as at the end of a product lifecycle. Given initial inventory and price values, a price schedule of product markdowns that maximizes business objectives while satisfying business constraints may be calculated. The price schedule may be used to maximize margin capture rates while reducing margin degradation and to provide accurate estimates of both margin capture rates and margin degradation factors. In addition, the present invention may be used to determine optimal start and end dates of a markdown horizon, or to determine which products should be put on a markdown plan. The present invention may be used to guide the decision of how many units of which product should be acquired for subsequent sale.

Systems and methods incorporating one or more of these or other advantages may be well suited for modern commercial environments such as those associated with marking down the price of a product to achieve a predetermined inventory target. Other technical advantages are readily apparent to those skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
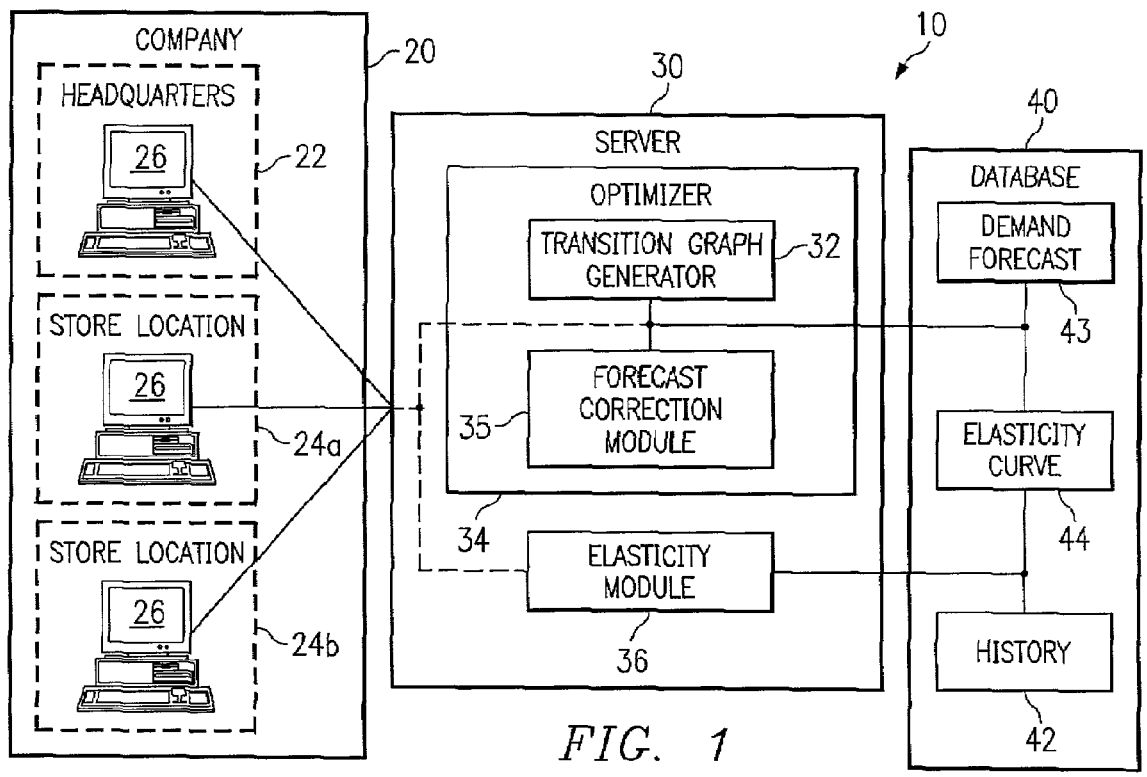
FIG. 1 illustrates an example system for generating an optimized price schedule for a product.

FIG. 1 illustrates an example system 10 that generates an optimized price schedule for a product. A price schedule lists prices for a product at successive stages of time. A company 20 may use system 10 to determine an optimized price schedule for a product sold by company 20. Depending on the nature of company 20, company 20 may include any combination of locations 24, for example, one or more sales locations 24.

Company 20 and/or one or more locations 24 may include a computer system 26 that may share data storage, communications, or other resources according to particular needs. Computer systems 26 may include appropriate input devices, output devices, mass storage media, processors, memory, or other components for receiving, processing, storing, and communicating information according to the operation of system 10. As used in this document, the term "computer" is intended to encompass a personal computer, work station, network computer, wireless data port, wireless telephone, personal digital assistant, one or more microprocessors within these or other devices, or any other suitable processing device. Reference herein to a location 24 may include reference to one or more associated computing devices and/or persons, as appropriate.

A server 30 manages applications that generate an optimized price schedule. Server 30 includes an optimizer 34 and an elasticity module 36. Optimizer includes a transition graph generator 32 and a forecast correction module 35. Transition graph generator 32 may be used to generate a transition graph that represents possible price schedules that satisfy predetermined business constraints. Optimizer 34 optimizes the transition graph generated by transition graph generator 32 in order to determine an optimal path of the transition graph. The optimal path represents an optimal price schedule. Forecast correction module 35 determines a projected number of unrealized sales, and converts a demand forecast into a sales forecast. Elasticity module 36 may be used to determine a projected price elasticity curve that transition graph generator 32 may use to generate a transition graph.

A database 40 stores data that may be used by server 30. History 42 may include data that may be used to generate a price schedule for a product, such as inventory history or sales history of one or more products. History 42 may include, for example, a number of units of a product sold, a price per unit, and a time at which the units were sold. Elasticity curve 44 describes an estimated change in demand for a product in response to a change of a price of the product. Demand forecast 43 describes a forecasted demand over time. Transition graph generator 32 uses elasticity curve 44 to determine an estimated change in the demand of a product in response to a change in the price of the product.

Locations 24 and/or database 40 may be coupled to server 30 using one or more local area networks (LANs), metropolitan area networks (MANs), wide area networks (WANs), a global computer network such as the Internet, or any other appropriate wire line, wireless, or other links.

Figure 2:
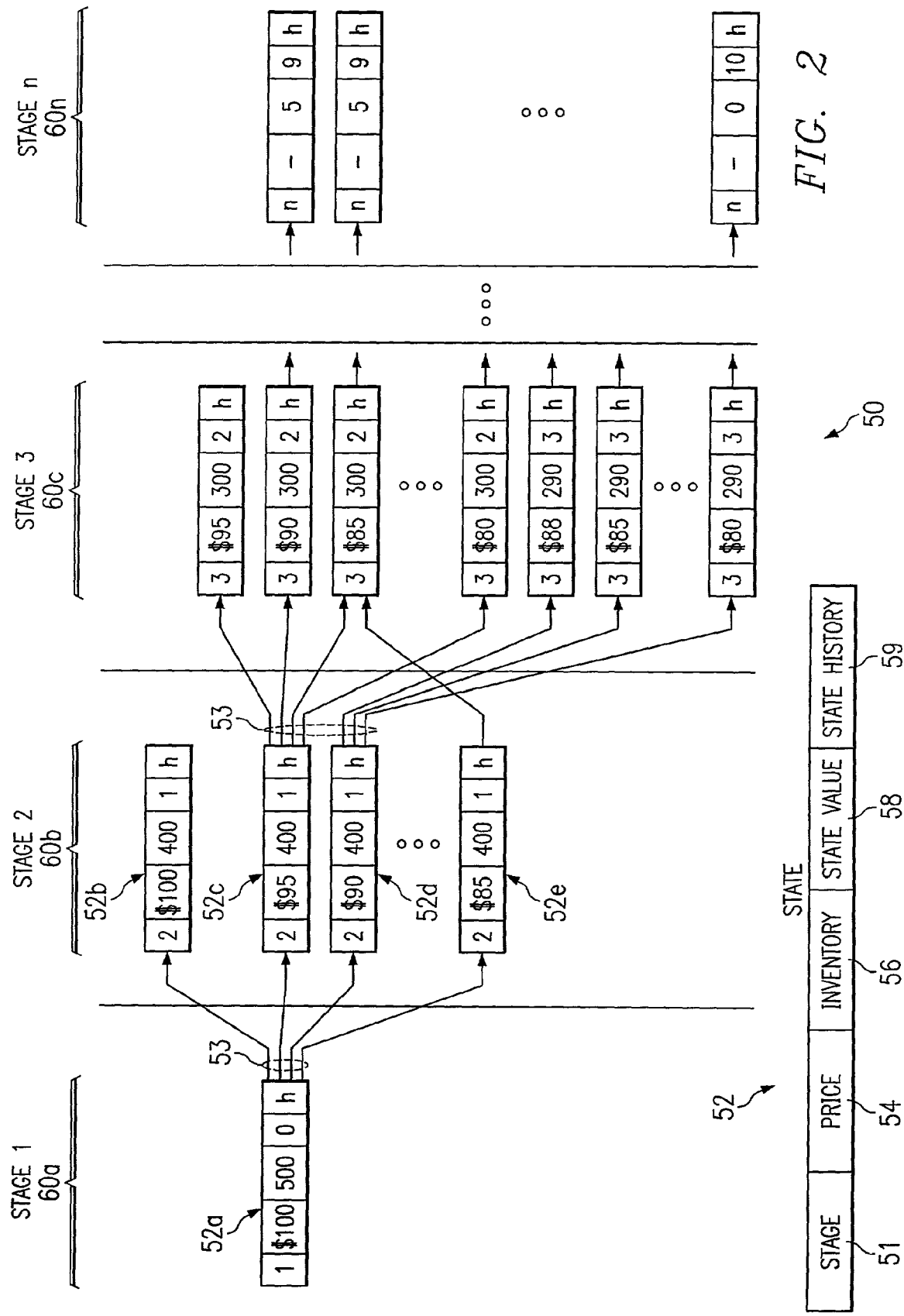
FIG. 2 illustrates an example transition graph that represents possible valid price schedules for a product.

FIG. 2 illustrates an example transition graph 50 that represents possible price schedules. Transition graph 50 includes states 52 at different stages 60. Stages 60 represent time intervals during which a product has a particular price. Stages 60 may represent any suitable time interval, for example, a week. Additionally, the time intervals represented by stages 60 may be equal to each other in length or may differ from each other, for example, using telescoping buffers. In the illustrated example, n stages 60 are illustrated. A predecessor state may be coupled to a successor state by a transition 53. A sequence of states 52 from stage 160*a* to stage n 60*n* coupled by transitions 53 form a path of transition graph 50.

A state 52 may include any combination of values, for example, a stage value 51, a price value 54, an inventory value 56, a state value 58, and a state history 59. Stage value 51 represents the number of the stage 60 at which state 52 occurs. Price value 54 represents the price per unit of a product. Price value 54 may alternatively be associated with a transition 53 from a predecessor state to a successor state. Inventory value 56 represents the number of units of the product in the inventory of company 20, typically at the beginning of the state following transactions at previous states.

State value 58 represents the value of state 52, and is used to calculate the value of the paths of transition graph 50. State value 58 may be computed from, for example, the sales of a product, the expected profit of a product, the gross margin of a product, the inventory carrying cost of an optimal path leading to the state, the number of price changes of an optimal path leading to the state, or the average selling price of a product. State history 59 of state 52 includes information associated with a path from the initial state to state 52. For example, state history 59 may include a number of price changes since stage 60*a* or a number of stages since a last price change. State history 59 may include a certainty value that measures the certainty of state value 58. The certainty value may be determined from an error margin associated with the calculation of state value 58.

In the illustrated example, transition graph 50 includes state 52*a* at stage 60*a*. State 52*a* has a price value 54 of "$100.00," an inventory value 56 of "500 units", a state value 58 of "0" (since state 52*a* is an initial state), and a state history 59 *h*. State 52*a* is a predecessor state to successor states 52*b-e*. Successor states 52*b-e* represent possible states at stage 60*b* given state 52*a* at stage 60*a*. States 52*b-e* include price values "$100.00," "$95.00," "$90.00," and "$85.00," respectively. These price values 54 represent possible prices of the product at stage 60*b* given that the product has a price value of $100.00 at stage 60*a*. Inventory values 56 of "400 units" for states 52*b-e* represent the number of units at stage 60*b* given that there were five hundred units with a price value of $100.00 per unit at stage 60*a*. Inventory value 56 may be computed using a demand forecast, and elasticity curve 44 provided by elasticity module 36. State values 58 of states 52*b-e* measure the value of states 52*b-e* given that one hundred units were sold at a price value of $100.00 per unit.

The values 54, 56, 58, and 59 may be quantized to reduce the number of successor states 52, which may reduce the complexity of transition graph 50. Reducing the complexity of transition graph 50 may in turn reduce the processing power and time needed to generate transition graph 50, which may be important if transition graph 50 is large. In one embodiment, price value 54 may be quantized. For example, specific price values 54 may be predetermined for each stage. "Each" as used in this document means each member of a set or each member of a subset of a set. In the illustrated example, the price values "$100.00", "$95.00," "$90.00," and "$80.00" may be predetermined for states 52*b-e*. Alternatively, changes in the price values 54 from one stage 60 to another stage 60 may be predetermined. For example, price changes of $0.00, -$5.00, -$10.00, and -$15.00 may be predetermined for states 52*b-e*. Alternatively, price increments may be predetermined. For example, price values at $5.00 increments may be predetermined for states 52*b-e*.

Similarly, inventory values 56 may be quantized. Inventory increments may be predetermined, and inventory values 56 at a successor stage 60 computed from price value 54 and an inventory value 56 at a predecessor stage 60 may be rounded up or down to the appropriate quantized inventory value 56. For example, an inventory increment may be predetermined to be ten units, and inventory values 56 of states 52 may be rounded up or down to inventory values at increments of ten units. Rounding of inventory values, however, is not required to store the states, but may be used to compare states.

Additionally, constraints may be used to reduce the number of successor states 52 generated from a predecessor state 52. Constraints may be placed on price value 54. For example, a maximum and a minimum price change may be used to limit the difference between price values 54 of a successor state 52 and the price values 54 of a predecessor state 52. In the illustrated example, a maximum price change is -$15.00, and no minimum price change is given. An absolute minimum price value 54 and an absolute maximum price value 54 may be defined to limit the price value 54 of any state 52. In the illustrated example, a maximum price value is the starting price of "$100.00," and a minimum price value is "$50.00."

A minimum and a maximum number of price changes may be used to control the number of times price value 54 may change from stage 60*a* to stage 60*n*. Alternatively, initial maximum and minimum price changes may be used to limit the price change from stage 60*a* to stage 60*b*, and subsequent maximum and minimum price changes may be used to limit price changes from stage 60*b* to stage 60*n*. A minimum number of stages 60 between price changes may be used to avoid frequent price changes. A maximum number of price changes may be defined to limit the number of price changes from stage 60*a* to stage 60*n*.

Constraints may be placed on inventory values 56. For example, a maximum ending inventory may be used to eliminate states 52 at stage 60*n* that include inventory values 56 that are too high. Additionally, constraints may define a penalty or cost for inventory left at the last stage 60. Maximum and minimum inventory values 56 may be used to control the unit's inventory at each stage 52.

Figure 3:
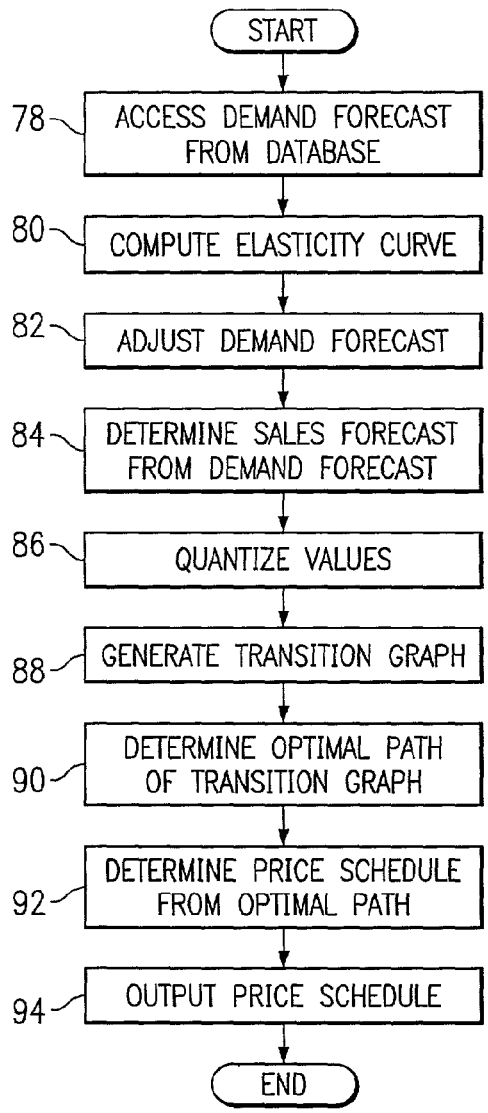
FIG. 3 illustrates an example method for generating an optimized price schedule for a product.

FIG. 3 illustrates an example method for generating an optimized price schedule for a product. At step 78, elasticity module 36 accesses demand forecast 43 from database 40. At step 80, elasticity module 36 computes an optimal elasticity curve 44. Elasticity curve 44 describes the change in the demand for a product in response to a change in the price of the product. A method for computing elasticity curve 44 is described in more detail with reference to FIG. 5. Demand forecast 43 is adjusted at step 82. Demand forecast 43 may be adjusted in order to take into account unrealized sales that are estimated at one or more sales locations 24. A method for adjusting demand forecast 43 is described in more detail with reference to FIG. 7. Demand forecast 43 is converted to a sales forecast at step 84. Generating an optimized price schedule for locations 24 in the aggregate uses a sales forecast. A method for converting demand forecast 43 is described in more detail with reference to FIG. 7.

The values describing the product are quantized at step 86 to reduce the complexity of the computation. At step 88, transition graph generator 32 generates a transition graph 50 that represents possible price schedules for a product. A method for generating transition graph 50 described with reference to FIG. 4. At step 90, optimizer 34 determines an optimal path of transition graph 50. The optimal path represents an optimized price schedule for company 20. Determining an optimal path is described in more detail with reference to FIG. 4. A price schedule is determined from the optimal path at step 92. The price schedule is output at step 94. A computer 26 may output the price schedule.

Figure 4:
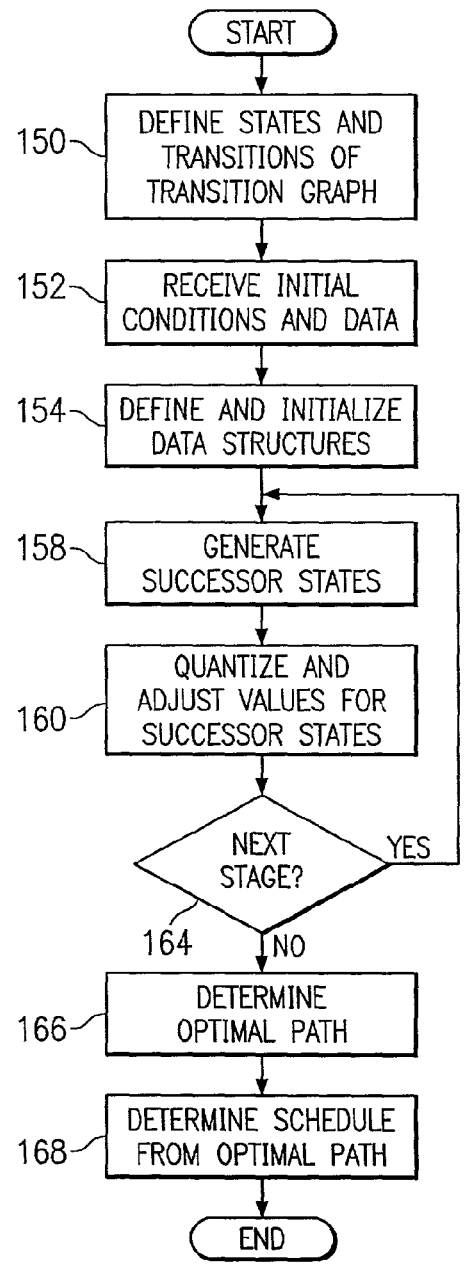
FIG. 4 illustrates an example method for computing elasticity.

FIG. 4 illustrates an example method for generating an optimized price schedule using dynamic programming. Using dynamic programming techniques, a transition graph 50 is generated. An optimal path of transition graph 50 is selected to determine an optimized price schedule. In one embodiment, a user at location 24 may use computer 26 to initiate transition graph generator 32, which may in turn use elasticity module 36 and optimizer 34 to generate an optimized price schedule.

Generating a price schedule includes generating transition graph 50 that comprises paths. Each path includes states 52, and each state 52 may include, but is not limited to, the following: a stage 60 relating to the state's position in the time horizon, an assigned price, a projected inventory level, a state value, and a record of historic information, such as number of previous price changes. The inventory level, value, and history of state 52 reflect the best path from the origin of transition graph 50 that leads to state 52.

Transition graph 50 may be generated by repeating the following for a number of stages 60 until a final stage is reached. The price value of a successor of a current state 52 is determined using a forecast of product demand at the current stage 60 and a mathematical model of the current stage's price-demand response, also referred to as "price-demand elasticity." The process of generating successor states may be called "state expansion". The stage 60, inventory level, value, and history of the successor state 52 are calculated using the current state information in addition to the forecasted demand and price-demand elasticity for the current state. The process of state expansion may be carried out for states 52 of a given stage, advancing stage 60 by stage 60 through the time horizon in order to construct transition graph 50. After the final stage 60 has been reached and states 52 have been expanded, an optimal path is selected according to the state values and other information of states 52. A price schedule is determined from the optimal path.

At step 150, transition graph generator 32 defines states 52 and transitions 53 of transition graph 50. States $q_i$ may be defined by Equation (6):

$$q_i = (s_i, p_i, c_i, v_i, h_i) \qquad (6)$$

where:
$s_i$ represents the stage,
$p_i$ represents the price at stage $s_i$,
$c_i$ represents the inventory of state $q_i$,
$v_i$ represents the value of state $q_i$,
$h_i$ represents accumulated state history of state $q_i$.

Set Q is defined as the set of all states $q_i$. While the state history may include various aspects relating to an optimal path to the state such as a number of price changes, the state representation as expressed by Equation (6) abstracts away the details of the state history. Different representations of a state may be used. Unless otherwise noted, the components of a state are labeled using the state's annotation. For example, the state q' has components labeled (s', p', c', v', h').

State value $v_i$ is used to evaluate states $q_i$ during state expansion. State value $v_i$ may represent, for example, revenues accumulated through state $q_i$. Additional or alternative criteria may be used to select an optimal final state from transition graph 50. For example, an evaluation function finalval: Q→R that maps states to real numbers may be used to evaluate inventory values and other values of a final state. A feasibility function finalfeasible: Q→{0,1} may be used to determine whether a final state is feasible according to the constraints. For example, a feasibility function may be used to determine whether a final inventory value is acceptable.

Initial conditions and data are received at step 152. Initial conditions may include a maximum number of stages n, an initial state $q_0$, and a maximum number M of inventory units allowed at the last stage n. Other constraints may also be included in the initial conditions. Initial conditions may also include quantization criteria such as quantized inventory levels C and quantized price levels P. Quantization of inventory and price values may be defined by Equations (7):

$$\gamma_c: R \to C \text{ quantization of inventory} \qquad (7)$$

$\gamma_c: R \to P$ quantization of price where R is the set of real numbers. In general, the quantization may be used to limit the number of states that may be generated at each stage while constructing the transition graph.

Initial data may include a demand forecast $F_s$ at a stage s, and an elasticity adjustment E(p,s) for price p at stage s that may be used to adjust demand forecast $F_s$. Elasticity adjustment E(p,s) may be determined from the elasticity curve calculated by elasticity module 36 according to the method as described in connection with FIG. 5. For example, an elasticity constant $c_E$ may be extracted from the elasticity curve, as expressed by Equation (1), and may be used to determine E(p,s). If only the effect of price on demand is considered, and if elasticity is assumed to be constant over time and given according to the model in Equation (1), E(p,s) may be defined using Equation (8):

$$E(p, s) = \left(\frac{p}{p_0}\right)^{c_E} \qquad (8)$$

Where
$c_E$ = elasticity constant
$p_0$ = base price on which forecast $F_s$ is based Transition 53 from a predecessor state 52 to a successor state 52 may be defined by a state-transition function expressed by Definition (9) that has a state-transition operator ↦:

$$(s,p,c,v,h) \mapsto (s',p',c',v',h'), \text{ if and only if} \qquad (9)$$

s'=s+1,
p'∈P,
c'=$\gamma_c$(max(0,c−$F_z$·E(p,s))),
v'=v+p·(c−c'),
h' captures the new state history and modifies h according to the transition, and
the transition to the new state is consistent with any additional constraints that may be imposed.

Definition (9) provides an example of a state-transition function. Transition 53, however, may be defined in any suitable manner. In addition, constraints may be placed on transition 53 in order to limit the successor states 52 of a state 52. Any of the components of state 52 may be constrained. A constraint may, for example, prohibit drastic or frequent changes in the price values. A price-adjusted demand forecast $F_s$·E(p,s) may be adjusted to take into account unrealized sales that occur at one or more sales locations 24. A method for adjusting the price-adjusted demand forecast is described in more detail in connection with FIG. 7.

The following summary outlines a method for determining an optimal final state. The method expands transition graph 50 and determines an optimal feasible final state. An optimized price schedule may be determined from the optimal feasible final state and transition graph 50. The subsequent description provides a more detailed description of the method.

Optimal Price Scheduling Algorithm (Summary)

Input: Stages $n$, Forecast $F_s$, Elasticity $E(p, s)$, Quantizations$_{c,p}$,
 Initial state $q_0$ 1  $K := \{q_0\}, U := Q \mid K, F := \{q \in U : q_0 \mapsto q\}$ 2  for $k = 1$ to $n$ 3    $S^k := \{\}$ 4    for each $\overline{p} \in P$ $S^k := S^k \cup \{(q^*, q') \in K \times F : \overline{q} \in F \ \&$ 5      $(q^*, q') = \underset{(q_1, q_2) \in K \times F}{\mathrm{argmax}} \{v_2 : q_1 \mapsto q_2 \ \&$ $q_2 = (k+1, \overline{p}, c_2, v_2, \overline{h}) \ \&$ $\gamma_c(c_2) = \gamma_c(\overline{c})\}$ 6    end 7    $K : K \cup F$

8    $U := U / F$

9    $F := \{q' \in U : \exists\, q \in K : q \mapsto q'\}$ 10  end

Output: $\mathrm{argmax}_{q \in K : \mathit{finalfeasible}(q)} \{\mathit{finalval}(q)\}$, $\mathrm{Graph}\left(K, \bigcup_{k=1,\ldots,n} S^k\right)$ At step 154, data structures that describe transition graph 50 are defined and initialized. The data structures may include set K at stage i, which is a set of maximal states q that may be coupled by transitions 53 from initial state $q_0$ to a state at stage i. A maximal state 52 may be calculated according to state value v. Equation (10) describes a valid invariant for the states in set K:

$$\forall\, q = (s, p, c, v, h) \in \qquad\qquad (10)$$
$$K : \underset{q' \in Q}{\mathrm{argmax}}\{v' : q_0 \mapsto^* q' \ \& \ q' = (s, p, c', v', h) \ \& \ \gamma_c(c') = \gamma_c(c)\}$$

where $\mapsto^*$ denotes a possibly repeated application of the state-transition operator $\mapsto$, defined by Definition (9). Equation (10) expresses that at any time, set K contains only maximal states, that is, states (s, p, c, v, h) for which there is no better state, having the same values of s, p, h, and the same quantized value of c, that is reachable from $q_0$.

Initially, set K is defined as $\{q_0\}$. Set F is a set of successor states 52 that may be coupled to a maximal predecessor state 52 of set K. Set U is a set of unexplored states 52 at a stage 60, and may be defined by $U = (Q \backslash W) \backslash F$. Set U may be initialized as $U := Q \backslash K$. Set S is a set of transitions 53 that couple a maximal predecessor state of set K to an unexplored successor state 52 of set U. Set S maybe initialized as $S := \{\ \}$.

Successor states 52 are generated at step 158. Successor states 52 may be generated by adding state transitions to the set $S^k$, according to Equation (11):

$$S^k := S^k \cup \{(q^*, q') \in K \times F \mid \overline{q} \in F \ \& \ (q^*, q') = \qquad (11)$$
$$\underset{(q_1, q_2) \in K \times F}{\mathrm{argmax}} \{v_2 \mid q_1 \mapsto q_2 \ \& \ q_2 =$$
$$(k+1, \overline{p}, c_2, v_2, \overline{h}) \ \& \ \gamma_c(c_2) = \gamma_c(c_2) = \gamma_c(\overline{c})\}$$

Ordered pair (q*,q') is a state-transition to be added, and $\overline{q}$ is a reachable state of set F that conforms to the specific price value $\overline{p}$. The argmax expression yields an ordered pair (q*,q'). State q' of the ordered pair represents a value-maximal successor state q', given fixed price value $\overline{p}$, state history value $\overline{h}$, and fixed inventory value $\overline{c}$, modulo the given quantization $\gamma_c$, and state q* represents the origin of the transition. State $\overline{q}$ binds inventory value $\overline{c}$ and state history value $\overline{h}$, and enforces that only states which equivalent state history values are compared in the argmax expression. Set F, set K, and set U, are updated according to Equations (12):

$F := \{q' \in U : \exists\, q \in K : q \mapsto q'\}$ $K := K \cup F$ $U := U \backslash F \qquad\qquad (12)$ A successor state 52 may be indexed by its maximal predecessor state 52 in order to allow for efficient retrieval of maximal states 52 from previous stages 60. The index may be implemented in any suitable manner, for example, using a hash function or static array indexing. Invalid successor states 52 may be eliminated according to the constraints specified in the initial conditions.

Values for the successor state 52 are quantized and adjusted at step 160. Values for successor states 52 may be quantized and adjusted using Equations (7). Price value p' is quantized according to the quantization criteria specified in the initial conditions. Quantizing values reduces the complexity of transition graph 50, which may improve the processing time required to determine an optimal path of transition graph 50. Inventory c' is also adjusted using the elasticity adjustment E(p,s). Inventory c' may also be adjusted in order to take into account unrealized sales that occur at one or more sales locations 24. A method for adjusting inventory values 56 is described in more detail in connection with FIG. 7.

Quantization may be applied in any suitable manner. For example, price values may be stored as quantized values, and inventory values may be stored as exact precise values. When different states are compared using Equation (11), the inventory values may be compared after quantization. If the quantized values are the same, the two successors can be regarded identical according to Equation (11).

At step 164, transition graph generator 32 determines whether there is a next stage 60. If there is a next stage 60, transition graph generator 32 returns to step 156 to define successor states 52 at the next stage 60. If there is no next stage 60 at step 164, transition graph generator 32 proceeds to step 166, where optimizer 34 determines an optimal path of, transition graph 50. The optimal path may be determined the at the final stage, which may be described by Equation (14), in terms of an optimal feasible solution and a transition graph:

$$\mathrm{argmax}_{q \in K\mathit{finalfeasible}} \{\mathit{finalval}(q)\}, \mathrm{Graph}\left(K, \bigcup_{k=1,\ldots,n} S^k\right) \qquad (12)$$

The selection of the optimal path may be limited by a constraint specified in the initial conditions, which may be labeled as finalfeasible. Additionally or alternatively, a predetermined certainty value may limit the optimal paths to paths that satisfy the predetermined certainty value.

A price schedule is determined from the optimal path at step 168. The path comprises a sequence of states 52 that describe a price value at each stage 60. The price values at each stage 60 are converted into a price schedule for a product. After the price schedule is determined, the method is terminated. A user may program transition graph generator 32 to periodically perform the method, for example, daily or weekly, in order to provide an updated price schedule generated using recent data.

In one embodiment, the present invention may be used to compute an optimal sequence of product markdowns for liquidating merchandise, which may enable sellers to better plan and more profitably manage inventory, for example, at the end of a product lifecycle. Given initial inventory and price values, a price schedule of product markdowns that maximizes business objectives while satisfying business constraints may be calculated.

Figure 5:
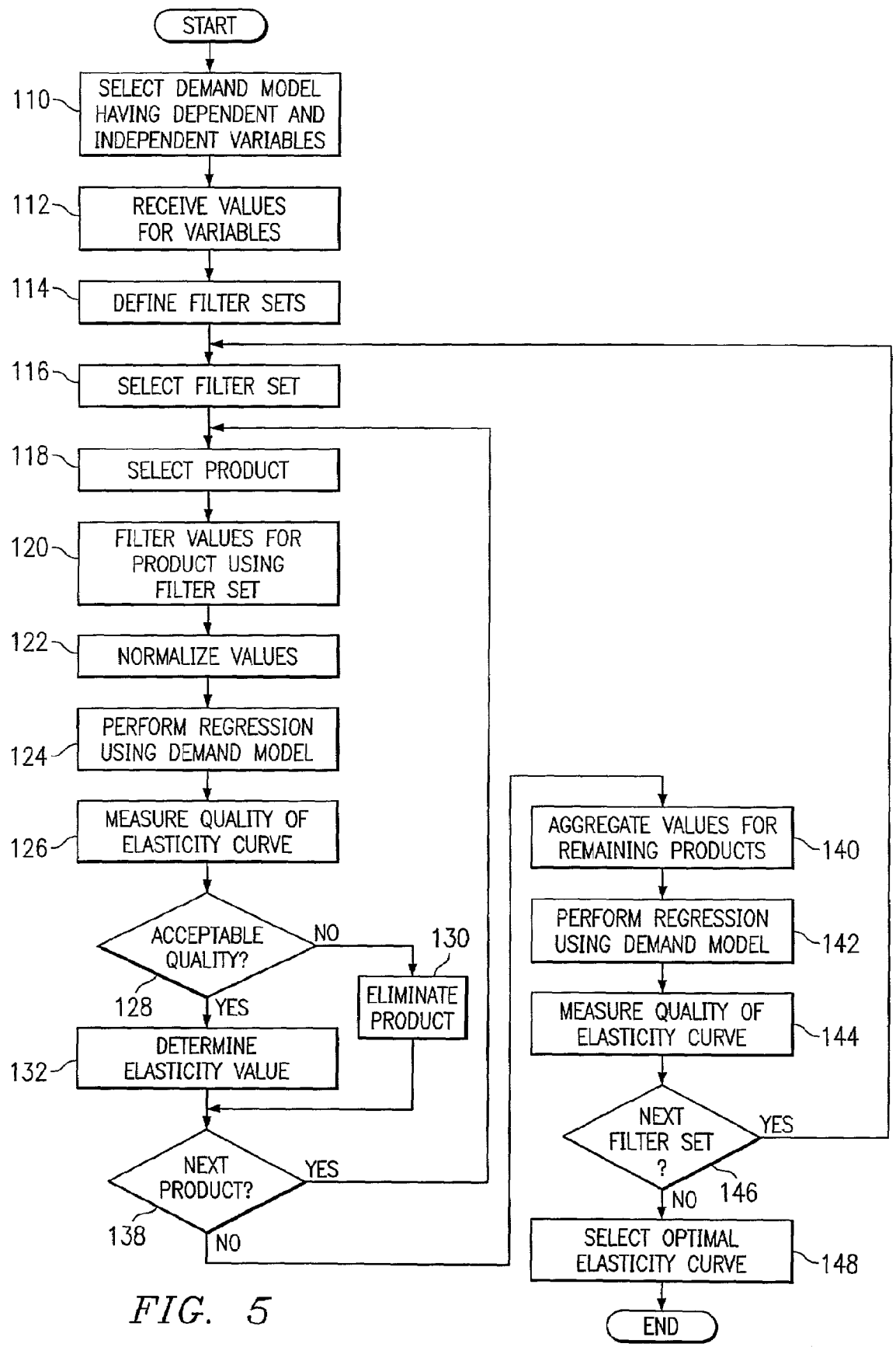
FIG. 5 illustrates an example method for optimizing a transition graph to generate an optimized price schedule for a product.

FIG. 5 illustrates an example method for computing elasticity. In one embodiment, a user at location 24 may use computer 26 to initiate elasticity module 36 to compute an elasticity curve 44. According to the method, elasticity module 36 determines an elasticity curve from state history and may use different filter sets to determine the elasticity curve. In general, each filter set is used to filter product data. Regression analysis is performed on the filtered data to yield elasticity curves. The fit of the data and the elasticity curves is measured, and an elasticity curve is selected.

Elasticity module 36 begins at step 110, where a demand model having dependent and independent variables is determined. The demand model may be defined by, for example, Equation (1):

$$D = KP^{c_E}(1+\alpha)^q t^\beta e^{\gamma t} \tag{1}$$

where:
D=demand
P=price
α=promotional variable
t=time
$c_E$=elasticity constant
K, q, β, and γ are constants, K>0, and it is expected that $c_E$<0, β>0, and γ<0. Equation (1) may be rewritten as Equation (2):

$$\ln(D) = \ln(K) + c \ln(P) + q \ln(1+\alpha) + \beta \ln(t) + \gamma t \tag{2}$$

Equation (2) may be used as a regression equation, where ln(D) is the dependent variable and ln(P), ln(1+α), ln(t), and t are the independent variables.

At step 112, values for the dependent and independent variables are received. The values may be derived from data describing one or more products. The products may include the product for which a price schedule is to be generated and/or products similar to the product for which a price schedule is to be generated. For example, a single product may not have sufficient sales history data to generate a meaningful price schedule, so data from similar products may be combined to generate a price schedule.

Data for a product may be grouped in data rows, where each data row includes data for a specific stage in time. A data row may include, for example, the following values: Product Identifier, Stage Number, Sales, Price, Revenues, and Promo. Product Identifier identifies the product, and Stage Number identifies the stage. Sales describes the number of units of the products sold during the stage, Price defines the price per unit, and Revenues describe the revenues generated from the sale of the product. Promo describes the number of units sold during a promotion for the product, such as a temporary price reduction. Other or additional values may be used to calculate an elasticity curve. For example, a seasonal index variable that describes how a time of year, such as the Christmas season, affects the demand for a product may be used.

The values for Sales may be used as the values for demand D. Values for Price and Stage Number may be used as the values for price P and time t. Promotion variable α measures the significance of a promotion, and may be defined using Equation (3):

$$\alpha := \begin{cases} \frac{\text{Promo}}{\text{Sales}}, & \text{if Promo} > \text{Promo Filter} \\ 0 & \text{otherwise} \end{cases} \tag{3}$$

where Promo Filter is a constraint.

Filter sets are defined at step 114. Each filter set comprises one or more constraints that restrict the values for the variables of the demand model. An example filter set is described by Table 1:

TABLE 1

| Filter Name | Description | Example Value |
|---|---|---|
| Min Sales | Minimum number of sales | 5 units |
| Min Revenues | Minimum revenues | $10 |
| Min Rows | Minimum number of data rows | 15 points |
| Promo Filter | Promotions filter | 5% |
| Perc Filter | Data value filter | 2.5% |

According to the filter set of Table 1, a data row is removed if Sales is less than Min Sales or Revenues is less than Min Revenues. The data rows for a product are removed if number of data rows for the product is less than Min Rows. Promo Filter is used to define promotion variable α, as shown in Equation (3). Data rows that include values that are within a first or last percentile given by Perc Filter are removed.

Steps 116 through 144 are performed for each filter set in order to determine the filter set that yields an optimal elasticity curve. At step 116, a filter set is selected. Steps 118 through 136 are performed on data for each product individually in order to eliminate unacceptable data. At step 118, a product is selected. At step 120, the values for the product are filtered using the filter set selected at step 116. The variables are normalized at step 122. Variables may be normalized according to Equations (4):

$$\text{Norm}(D) = \ln(D) - \text{Mean}(\ln(D))$$

$$\text{Norm}(P) = \ln(P) - \text{Mean}(\ln(P))$$

$$\text{Norm}(t) = t - \text{Mean}(t)$$

$$\text{Norm}(\ln(t)) = \ln(t) - \text{Mean}(\ln(t)) \tag{4}$$

where Mean (x) is the average of x.

At step 124, a regression analysis is performed using the demand model, as expressed by Equation (2), as the regression equation of the dependent variable over the independent variables, that is, of ln(D) over ln(P), ln(1+α), ln(t), and t. The regression analysis yields values for coefficients $c_E$, K, q, β, and γ, which are inserted into Equation (2) to define a regression or elasticity curve. The quality of the elasticity curve is measured at step 126. The quality may be measured by determining the fit of the elasticity curve to the values that were used to generate the elasticity curve, and may be measured using a Box-Wetz value B expressed by Equation (5):

$$B = (\max_i \hat{Y}_i - \min_i \hat{Y}_i) / \sqrt{\frac{ps^2}{n}} \quad (5)$$

where:

$p$ = number of parameters $s^2 \approx \sigma^2 V(Y_i)$ $\overline{V}(\hat{Y}) = \sum_i V(\hat{Y}_i)/n$ The quality of the elasticity curve is determined to be acceptable or not at step 128. The quality may be acceptable if it satisfies a predetermined criteria. If the quality is not acceptable, the data for the product is eliminated at step 130, and elasticity module 36 proceeds to step 138. If the quality is acceptable, elasticity module 36 proceeds to step 132.

At step 132, an elasticity value is determined from the elasticity curve. The negative of the elasticity coefficient $c_E$ of the price variable P may be used as the elasticity value. In one embodiment, the elasticity value is required to be positive.

At step 138, elasticity module 36 determines whether there is a next product. If there is a next product, elasticity module 36 returns to step 118, where the next product is selected. If there is no next product, elasticity module 36 proceeds to step 140.

Steps 140 through 144 are performed on the aggregated data for the products in order to determine which filter set provides an optimized fit of the elasticity curve. At step 140, the data for the remaining products are aggregated to yield aggregated data. At step 142, regression analysis is performed on the aggregated data. The regression analysis may use the demand model as expressed by Equation (2) as the regression equation of the dependent variable over the independent variables. The quality of the elasticity curve is measured at step 144, and may be measured in a manner substantially similar to that described above in connection with step 126.

At step 138, elasticity module 36 determines whether there is a next filter set. If there is a next filter set, elasticity module 36 returns to step 116, where the next filter set is selected. If there is no next filter set, elasticity module 36 proceeds to step 148, where an optimal elasticity curve is selected. The optimal elasticity curve may be the highest quality elasticity curve according to measurements performed at step 144. Additionally, the elasticity curve may be rewritten in the format of Equation (1) and sent to transition graph generator 32. After selecting the optimal elasticity curve, elasticity module 36 terminates the method. A user may program elasticity module 36 to perform the method periodically, for example, daily or weekly, in order to provide an updated elasticity curve to transition graph generator 32.

Figure 6A:
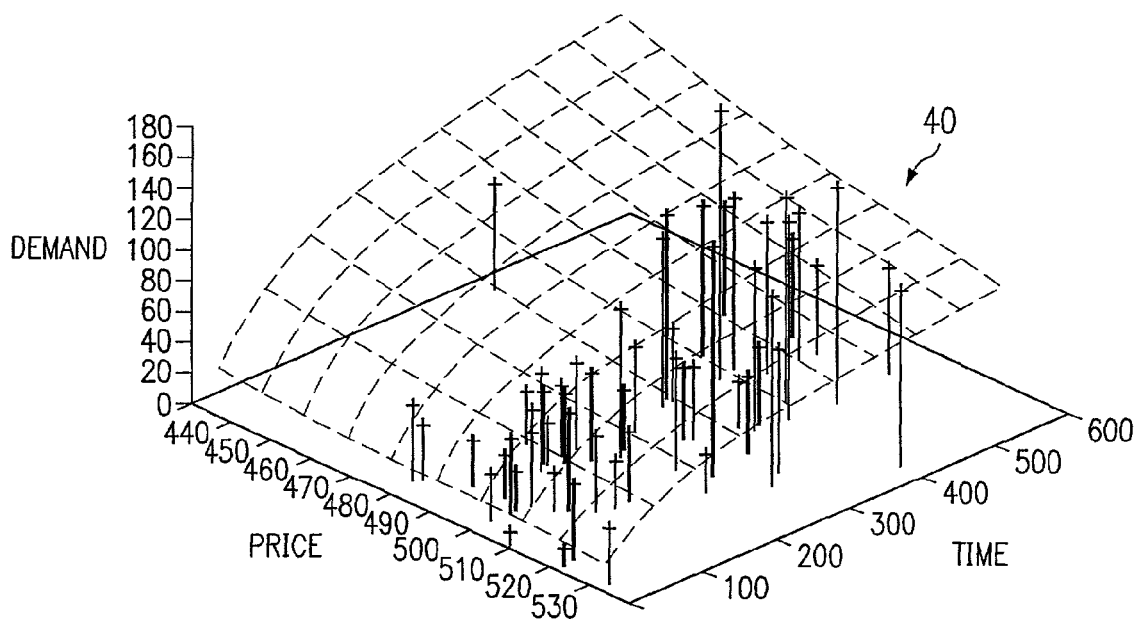
FIGS. 6A through 6C illustrate example an elasticity curve.
Figure 6B:
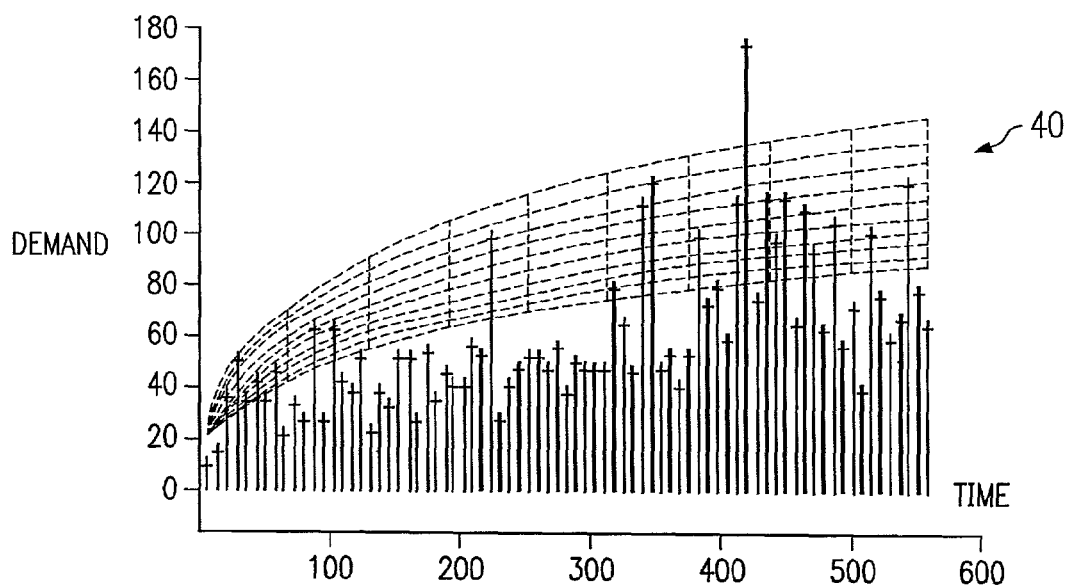
Figure 6C:
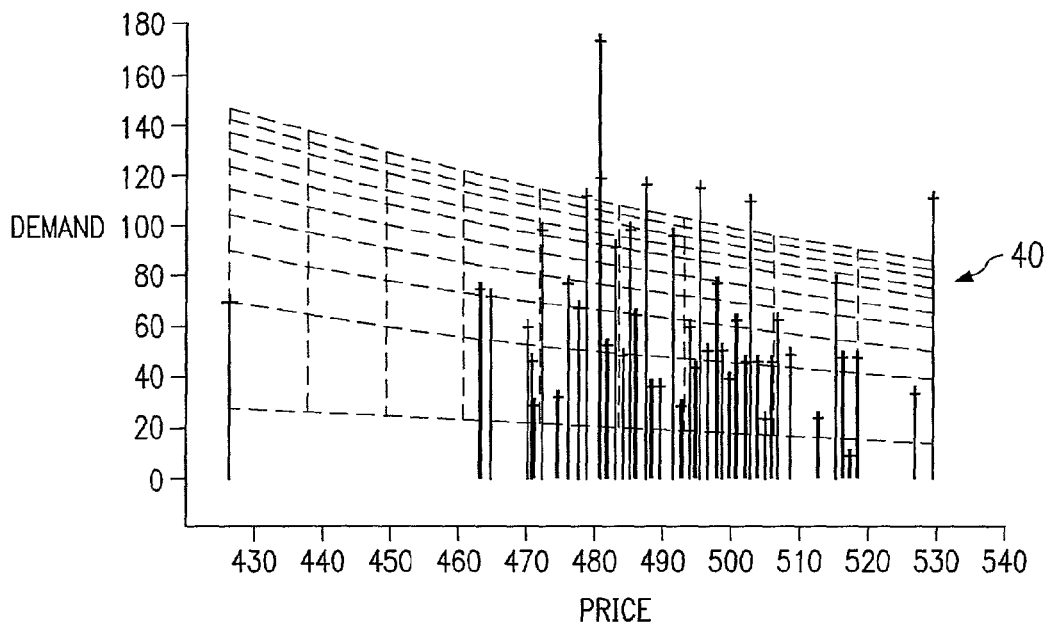

FIGS. 6A through 6C illustrate an example elasticity curve 40. FIG. 6A illustrates elasticity curve 40 with respect to time. Elasticity curve 40 is computed from price values and demand values. FIG. 6B illustrates elasticity curve 40 and the demand values with respect to time. FIG. 6C illustrates elasticity curve 40 and the demand values with respect to the price values.

Figure 7:
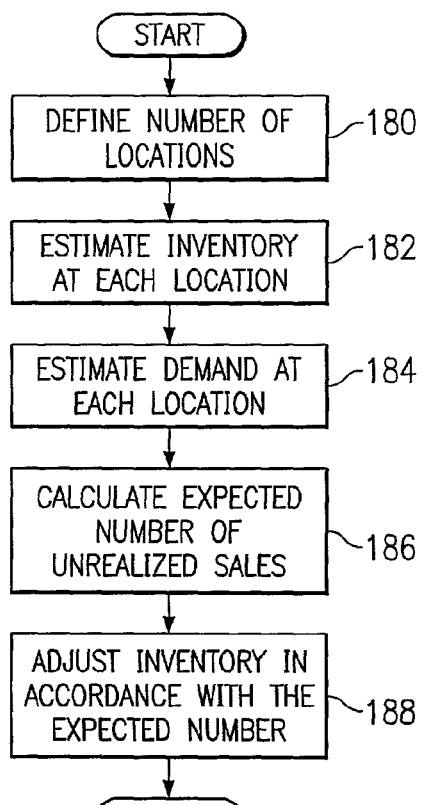
FIG. 7 illustrates an example method for adjusting an aggregate inventory value.

FIG. 7 illustrates an example method for estimating a sales forecast from a demand forecast and an aggregate inventory value that describes the total inventory spread across a number of locations 24 of company 20. A demand forecast typically predicts customer demand, but not sales. Computing an optimized price schedule for a number of locations 24 in the aggregate, however, requires the prediction of sales instead of demand. An aggregate sales forecast may be calculated from the aggregate inventory value and demand values from predecessor states 52.

Unrealized sales, or stockouts, may be determined in order to predict sales. An unrealized sale is predicted where there is a demand at a location, but no inventory. An unrealized sale may be expressed as a difference between a demand value and an inventory value at any given location 24. According to the method, a demand forecast is adjusted to take into account unrealized sales that may be predicted at one or more locations 24 of company 20, which may improve the accuracy of the predicted inventory values of an optimized price schedule.

The method performs a significant adjustment to the demand forecast when inventory levels and forecasted demands are aggregated across a number of locations 24, or a store-group. The method may be used with the method for generating an optimized price schedule as described with reference to FIG. 4, in order to improve the accuracy of the predicted number of sales when operating on a store-group level. The method may be used at each state-expansion in order to estimate the unit sales from the demand forecast, thereby significantly improving the accuracy of the inventory level of a successor state, in particular at low inventory levels. The method may be calibrated to a particular location 24 and replenishment situation based on historic sales and inventory figures.

This method may be applied as part of the computation of the optimal price schedule, particularly if the estimate is not accurately performed as a preprocessing step. This may be the case if the demand value at each stage of the price scheduling horizon is dependent on a price value, and the future inventory values are dependent on the demand value. As has been outlined above, the prediction of sales in turn depends on the inventory values, leading to a circular dependency. The circular dependency may be resolved by taking the effect of distributed inventory on projected sales into account at each step of the computation of a price schedule. FIG. 7 describes how a projected number of sales can be computed, given a demand forecast and an aggregate inventory at locations 24.

At step 180, transition graph generator 32 defines a number n of locations 24. An inventory s at each location 24 is estimated at step 182. Inventory s may be estimated by, for example, randomly populating each location 24 with inventory units. A demand at d at each location 24 is estimated at step 184. Demand d at each location 24 may be estimated by randomly populating each location 24 with demand units. This random sampling may be performed a number of times. The expected number E(M) of unrealized sales is determined at step 186.

Alternatively, steps 182 through 186 may be performed using a probabilistic estimation. Given S units that are assumed to be evenly distributed across a number of n locations, the probability of a location receiving s units may be expressed using a binomial distribution. The binomial distribution may be used to determine the probability of s successful experiments, where the probability of success is 1/n. The random variable that represents the number of units of inventory at any particular store may be denoted by $X_s$. At step 182, inventory s at each location 24 may be estimated by calculating the probability of a location 24 having inventory s using Equation (15):

$$p(X_S = s) = Bnp\left(S, s, \frac{1}{n}\right) = \binom{S}{n} \cdot \left(\frac{1}{n}\right)^s \cdot \left(1 - \frac{1}{n}\right)^{S-s} \quad (15)$$

where S represents the total amount of inventory at all locations 24. Similarly, at step 184, the probability of demand d at each location 24 may be calculated using Equation (16):

$$p(X_D = d) = Bnp\left(D, d, \frac{1}{n}\right) = \binom{D}{d} \cdot \left(\frac{1}{n}\right)^d \cdot \left(1 - \frac{1}{n}\right)^{D-d} \quad (16)$$

where D represents the aggregate demand summed over locations 24, and $X_D$ denotes the random variable that represents the unit demand at a particular location 24.

The expected number of unrealized sales E(M) may be calculated at step 186 using Equation (17):

$$\begin{aligned} E(M) &= \sum_{s=1}^{S} \sum_{d=s+1}^{D} p(S = s, D = d) \cdot (d - s) \\ &= \sum_{s=1}^{S} p(S = s) \sum_{d=s+1}^{D} p(D = d) \cdot (d - s) \\ &= \sum_{s=1}^{S} Bnp\left(S, s, \frac{1}{n}\right) \cdot \sum_{d=s+1}^{D} Bnp\left(D, d, \frac{1}{n}\right)(d - s) \\ &= \sum_{s=1}^{S} \left[ \binom{S}{s} \cdot \left(\frac{1}{n}\right)^s \cdot \left(1 - \frac{1}{n}\right)^{S-s} \cdot \sum_{d=s+1}^{D} \binom{D}{d} \cdot \left(\frac{1}{n}\right)^d \cdot \left(1 - \frac{1}{n}\right)^{D-d} (d - s) \right] \end{aligned} \quad (17)$$

To efficiently implement computation of unrealized sales E(M) on system 10, different numerical approximations schemes may be used, depending on the value ranges of the input parameters. In the following, several approximation schemes are described that can be applied according to the value ranges of D, S, and n.

The binomial distribution as expressed by Equation (18):

$$Bnp(k, n, p) = \binom{n}{k} p^k (1 - p)^{n-k} \quad (18)$$

may be approximated by the Poisson distribution for a sufficiently large n, a sufficiently small p, and moderately sized np, as expressed by Equation (19):

$$Bnp(k, n, p) = \frac{\lambda^k e^{-\lambda}}{k!}, \quad (19)$$

where $\lambda = np$. This can be applied, for example, to the computation of E(M) at step 182, if $np \geq 10$. Thus, steps 182 through 186 may be performed using a Poisson approximation to a binomial distribution by computing the probability of a location 24 having an inventory s or demand d using Equation (19).

At step 186, expected number E(M) may be determined using Equation (20):

$$\begin{aligned} E(M) &= \sum_{s=1}^{S} \sum_{d=s+1}^{D} Bnp\left(S, s, \frac{1}{n}\right) \cdot Bnp\left(D, d, \frac{1}{n}\right)(d - s) \\ &= \sum_{s=1}^{S} \left[ \frac{(\lambda_S)^s e^{-\lambda_S}}{s!} \cdot \sum_{d=s+1}^{D} \frac{(\lambda_D)^d e^{-\lambda_D}}{d!}(d - s) \right] \end{aligned} \quad (20)$$

Alternatively, the computation in Equation (17) may be performed by using an incomplete beta-function. The inner sum of Equation (17) may be denoted by J, and Equations (21) through (28) may be used to describe the steps to transform J into a form that may be efficiently computed using a standard procedure for the incomplete beta-function.

$$\begin{aligned} J &= \sum_{d=s+1}^{D} Bnp\left(D, d, \frac{1}{n}\right)(d - s) \\ &= \sum_{d=s+1}^{D} \binom{D}{d}\left(\frac{1}{n}\right)^d \left(1 - \frac{1}{n}\right)^{D-d}(d - s) \end{aligned} \quad (21)$$

Probabilities p and q are defined using Equations (22):

$$\begin{aligned} p &= \frac{1}{n} \\ q &= 1 - p \end{aligned} \quad (22)$$

J may then be expressed by J1 and J2, as shown by Equation (23):

$$\begin{aligned} J &= \sum_{d=s+1}^{D} \binom{D}{d} p^d q^{D-d} d - \sum_{d=s+1}^{D} \binom{D}{d} p^d q^{D-d} s \\ &= J1 - J2 \end{aligned} \quad (23)$$

where $$J1 = \sum_{d=s+1}^{D} \binom{D}{d} p^d q^{D-d} d,$$

and $$J2 = s \sum_{d=s+1}^{D} \binom{D}{d} p^d q^{D-d}$$

Expression $$\binom{D}{d} d$$

may be substituted by Equation (24):

$$\binom{D}{d}d = \frac{D!d}{(D-d)!d!} \quad (24)$$
$$= D\frac{(D-1)!}{(D-d)!(d-1)!}$$
$$= D\binom{D-1}{d-1}$$

Furthermore, J1 may be described by Equation (25):

$$J1 = Dp\sum_{d=s+1}^{D}\binom{D-1}{d-1}p^{d-1}q^{D-d} \quad (25)$$
$$= Dp\sum_{d'=s}^{D'}\binom{D'}{d'}p^{d'}q^{D'-d'}$$

where:
$D' = D - 1$.

To compute J, the components J1 and J2 and Equation (26) may be used:

$$\sum_{l=k_i}^{Q}\binom{Q}{l}p^l q^{Q-l} = Ip(k_i, Q-k, +1) \quad (26)$$

where $I_x(a,b)$ is an incomplete beta function given by Equation (27), $$I_x(a, b) = \frac{1}{B(a, b)}\int_0^x t^{a-1}(1\ldots t)^{b-1} dt \quad (27)$$

where $$B(a, b) = \int_0^\infty t^{a-1}(1-t)^{b-1} dt \quad (28)$$

At step 188, the aggregate sales forecast is computed according to the expected number of unrealized sales. An aggregate sales forecast at a successor state 52 is calculated by subtracting the expected sales from the aggregate inventory at a predecessor state 52. The demand does not take into account unrealized sales. Thus, the expected number of unrealized sales may be subtracted from the forecasted demand to account for unrealized sales, which may yield a more accurate price schedule. After the forecast is adjusted, the method is terminated.

The present invention may efficiently generate an optimized price schedule by using dynamic programming. In dynamic programming, transition graph 50 with paths representing possible price schedules is generated, and an optimal path of the transition graph 50 is selected in order to determine an optimized price schedule. The present invention may also improve the efficiency of the optimization by using quantized dynamic programming, which involves quantifying values associated with transition graph 50. Quantizing the values reduces the complexity of transition graph 50, which may improve the processing time and power required to determine an optimal path of transition graph 50. In addition, the present invention may use an improved calculation of elasticity in order to increase the accuracy of the optimization. Moreover, the present invention may take into account an unrealized sale that occurs at one of many locations, which may improve the accuracy of the optimal path.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A computer-implemented method for generating a price schedule for one or more products, the method comprising:
   generating, by a computer system, a plurality of stages, each stage representing a time interval and comprising one or more states and a plurality of paths, each path comprising a plurality of states, the plurality of states having at least one predecessor state that is coupled with at least one successor state by a transition, each state having a price value, an inventory value, and a state value;
   generating, by the computer system, a transition graph by repeating the following for the plurality of stages until a final stage is reached:
      determining the price value of a successor state;
      calculating the inventory value of the successor state using the price value and the inventory value of a predecessor state; and
      calculating the state value of the successor state using the price value and the inventory value of the predecessor state;
   applying one or more constraints that limits a difference in values between a successor state and a predecessor state;
   selecting, by the computer system, a path of the plurality of paths according to the state values of the one or more states;
   determining, by the computer system, a price schedule from the selected path; and
   outputting, by the computer system, the price schedule to one or more computers associated with one or more entities.

2. The method of claim 1, further comprising quantizing the inventory value of each successor state.

3. The method of claim 1, further comprising quantizing the price value of each successor state.

4. The method of claim 1, further comprising:
   defining a plurality of locations;
   determining a demand forecast for the plurality of locations;
   calculating an expected number of unrealized sales at each of the plurality of locations;
   adjusting the demand forecast in response to the expected number of unrealized sales;
   determining a sales forecast from the demand forecast; and
   adjusting the inventory value of the successor state in response to the sales forecast.

5. A system for generating a price schedule for one or more products, the system comprising:
   a computer system coupled with one or more entities, the computer system comprising:
      a storage medium stored therein a transition graph generator, the transition graph generator configured to generate:

a plurality of stages, each stage representing a time interval and comprising one or more states and a plurality of paths, each path coupling a sequence of the one or more states, such that at least one predecessor state that is coupled with at least one successor state by a transition, each state having a price value, an inventory value, and a state value;

a transition graph by repeating the following for the plurality of stages until a final stage is reached:
  determining the price value of a successor state;
  calculating the inventory value of the successor state using the price value and the inventory value of a predecessor state; and
  calculating the state value of the successor state using the price value and the inventory value of the predecessor state;
applying one or more constraints that limits a difference in values between a successor state and a predecessor state; and
a storage medium stored therein an optimizer coupled with the transition graph generator and configured to:
  select a path of the plurality of paths according to the state values of the one or more states; and
  determine a price schedule from the selected path,
wherein the computer system is further configured to output the price schedule to one or more computers associated with the one or more entities.

6. The system of claim 5, wherein the transition graph generator is further configured to quantize the inventory value of each successor state.

7. The system of claim 5, wherein the transition graph generator is further configured to quantize the price value of each successor state.

8. The system of claim 5, further comprising an elasticity module coupled to the transition graph generator and further configured to compute an elasticity curve, the transition graph generator further configured to compute the inventory value of each successor state using the elasticity curve.

9. The system of claim 5, wherein the transition graph generator is further configured to:
  define a plurality of locations;
  determine a demand forecast for the locations;
  calculate an expected number of unrealized sales at each location;
  adjust the demand forecast in response to the expected number of unrealized sales;
  determine a sales forecast from the demand forecast; and
  adjust the inventory value of the successor state in response to the sales forecast.

10. A computer-readable storage media embodied with software for generating a price schedule for one or more products, the software when executed using a computer system is configured to:
  generate a plurality of stages, each stage representing a time interval and comprising one or more states and a plurality of paths, each path comprising a plurality of states, the plurality of states having at least one predecessor state that is coupled to at least one successor state by a transition, each state having a price value, an inventory value, and a state value,
  generate a transition graph by repeating the following for the plurality of stages until a final stage is reached:
    determine the price value of a successor state;
    calculate the inventory value of the successor state using the price value and the inventory value of a predecessor state; and
    calculate the state value of the successor state using the price value and the inventory value of the predecessor state;
  apply one or more constraints that limits a difference in values between a successor state and a predecessor state;
  select a path of the plurality of paths according to the state values of the one or more states;
  determine a price schedule from the selected path; and
  output the price schedule to one or more computers associated with one or more entities.

11. The computer-readable storage media of claim 10, wherein the software is further configured to quantize the inventory value of each successor state.

12. The computer-readable storage media of claim 10, wherein the software is further configured to quantize the price value of each successor state.

13. The computer-readable storage media of claim 10, wherein the software is further configured to:
  compute an elasticity curve; and
  compute the inventory value of each successor state using the elasticity curve.

14. The computer-readable storage media of claim 10, wherein the software is further configured to:
  define a plurality of locations;
  determine a demand forecast for the locations;
  calculate an expected number of unrealized sales at each location;
  adjust the demand forecast in response to the expected number of unrealized sales;
  determine a sales forecast from the demand forecast; and
  adjust the inventory value of the successor state in response to the sales forecast.

* * * * *